United States Patent [19]

Potter et al.

[11] Patent Number: 4,936,340

[45] Date of Patent: Jun. 26, 1990

[54] PRESSURE REGULATOR

[75] Inventors: Jared M. Potter, Redwood City; Douglas N. Sweet, Mt. View, both of Calif.

[73] Assignee: Coretest Systems, Inc., Mt. View, Calif.

[21] Appl. No.: 369,212

[22] Filed: Jun. 21, 1989

[51] Int. Cl.$^5$ ............................................. G05D 16/20
[52] U.S. Cl. .................................. 137/487.5; 251/57; 251/129.11
[58] Field of Search ............ 137/487.5; 251/57, 129.11

[56] References Cited

U.S. PATENT DOCUMENTS

| | | |
|---|---|---|
| 2,268,960 | 1/1942 | Ray . |
| 3,307,824 | 3/1967 | Weisheit . |
| 3,317,180 | 5/1967 | Dryden . |
| 3,464,438 | 9/1969 | Maurer . |
| 4,203,465 | 5/1980 | Rissi . |
| 4,313,461 | 2/1982 | Brumm ............................. 251/57 X |
| 4,550,747 | 11/1985 | Woodworth ..................... 137/487.5 |

OTHER PUBLICATIONS

Perry et al., "Chemical Engineers Handbook," 5th Edition, pp. 22-87 to 22-104 (1973).
Condyne Sales Materials (1988).

Primary Examiner—Alan Cohan
Attorney, Agent, or Firm—Townsend and Townsend

[57] ABSTRACT

A pressure control assembly is disclosed. The assembly includes a pressure transducer for detecting upstream pressure. A diaphragm is used to regulate flow through the assembly, and is forced into a closed position by pressure from a fluid column. The pressure on the fluid column is controlled by a piston driven by a step motor. The step motor is activated in response to signals from the pressure transducer.

11 Claims, 8 Drawing Sheets

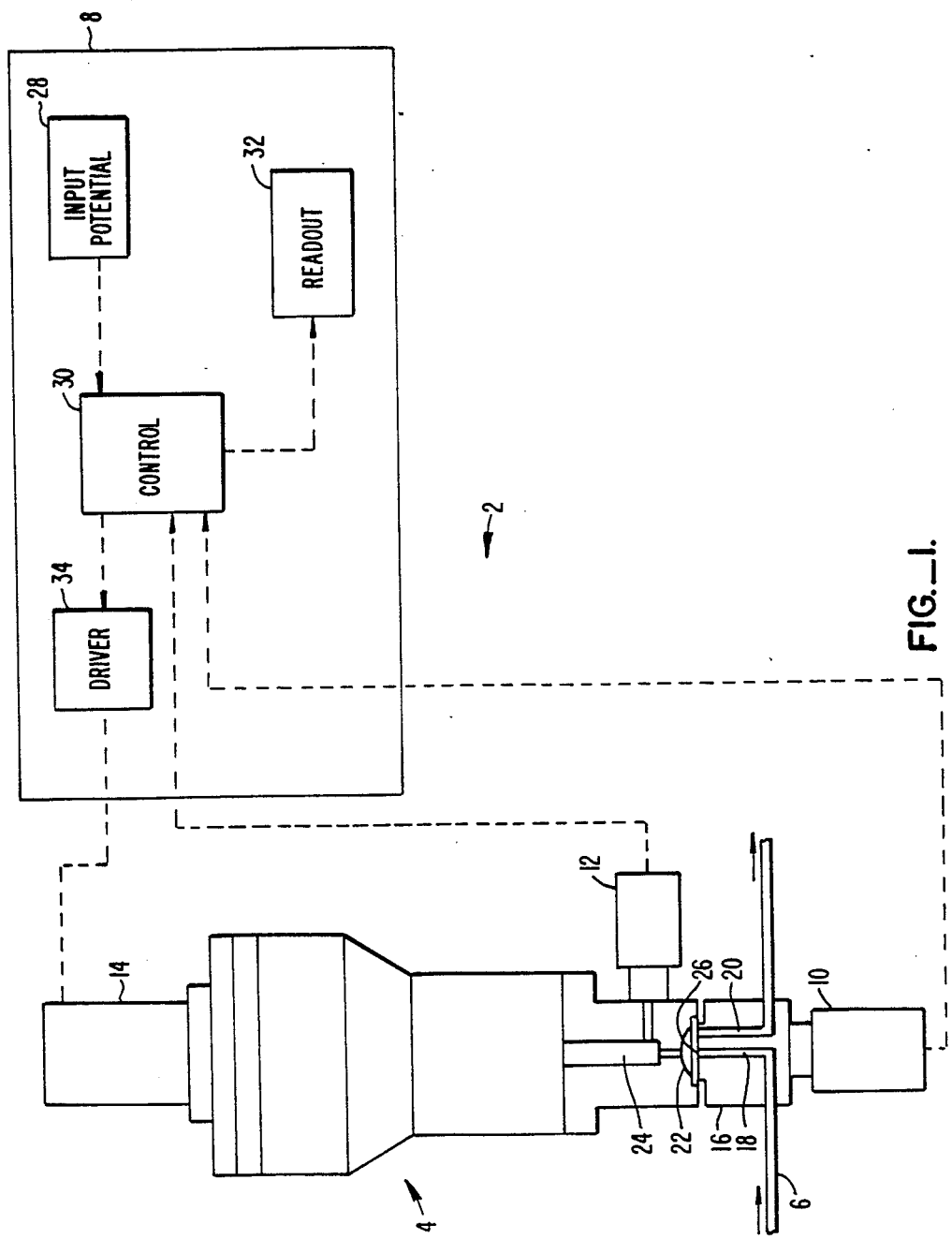
FIG._1.

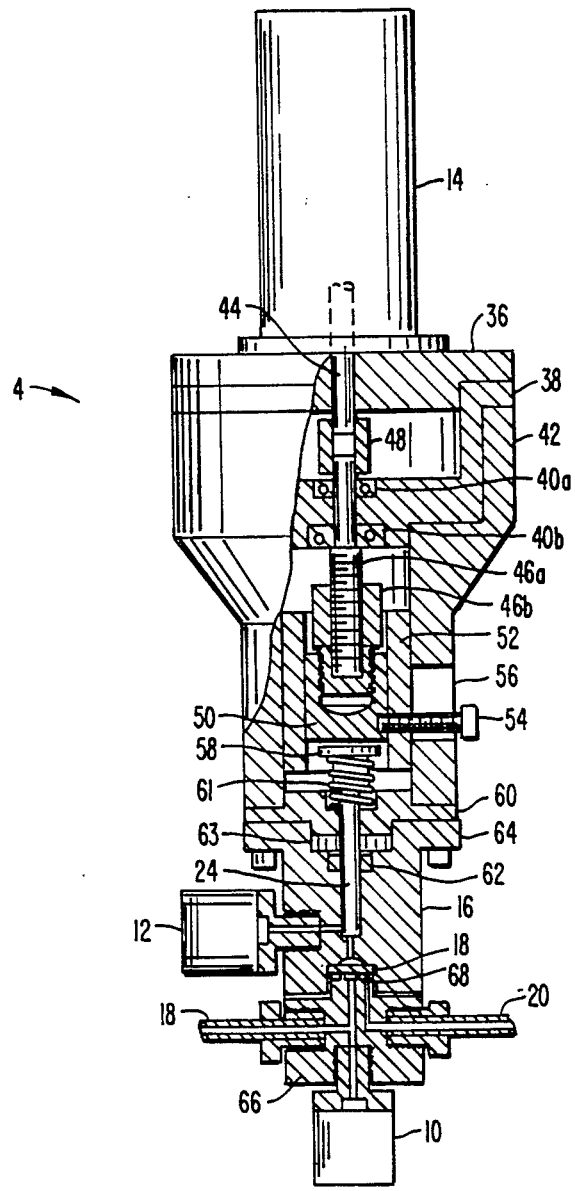
FIG._2.

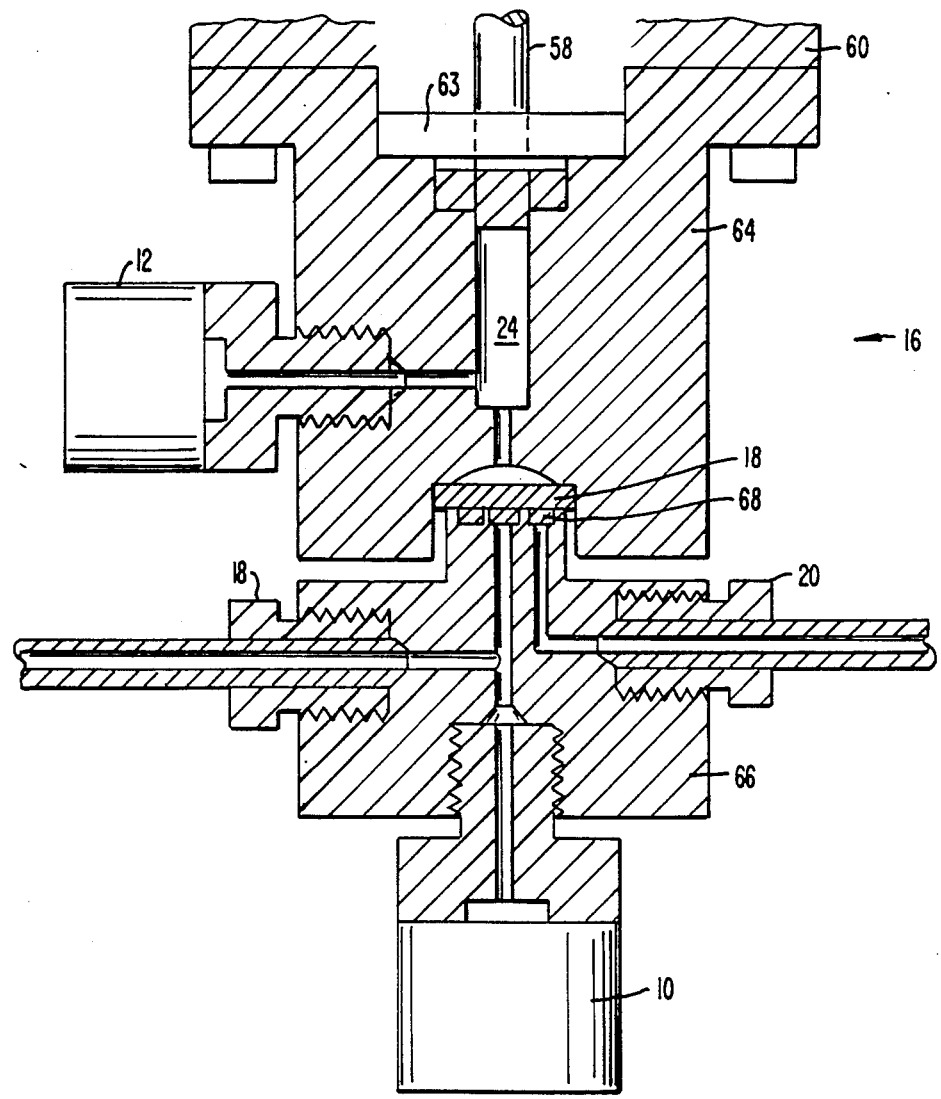
FIG._3.

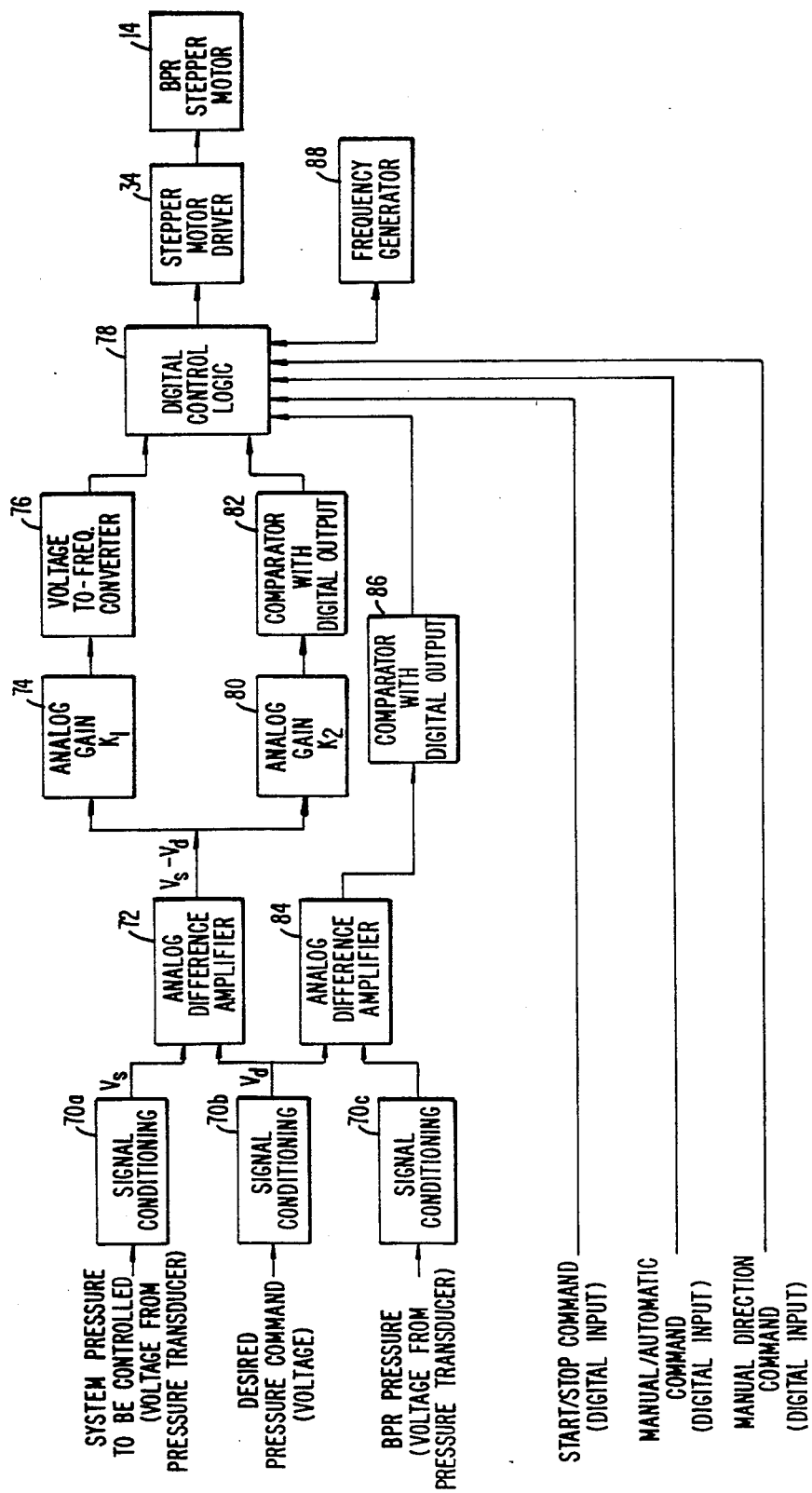
FIG._4.

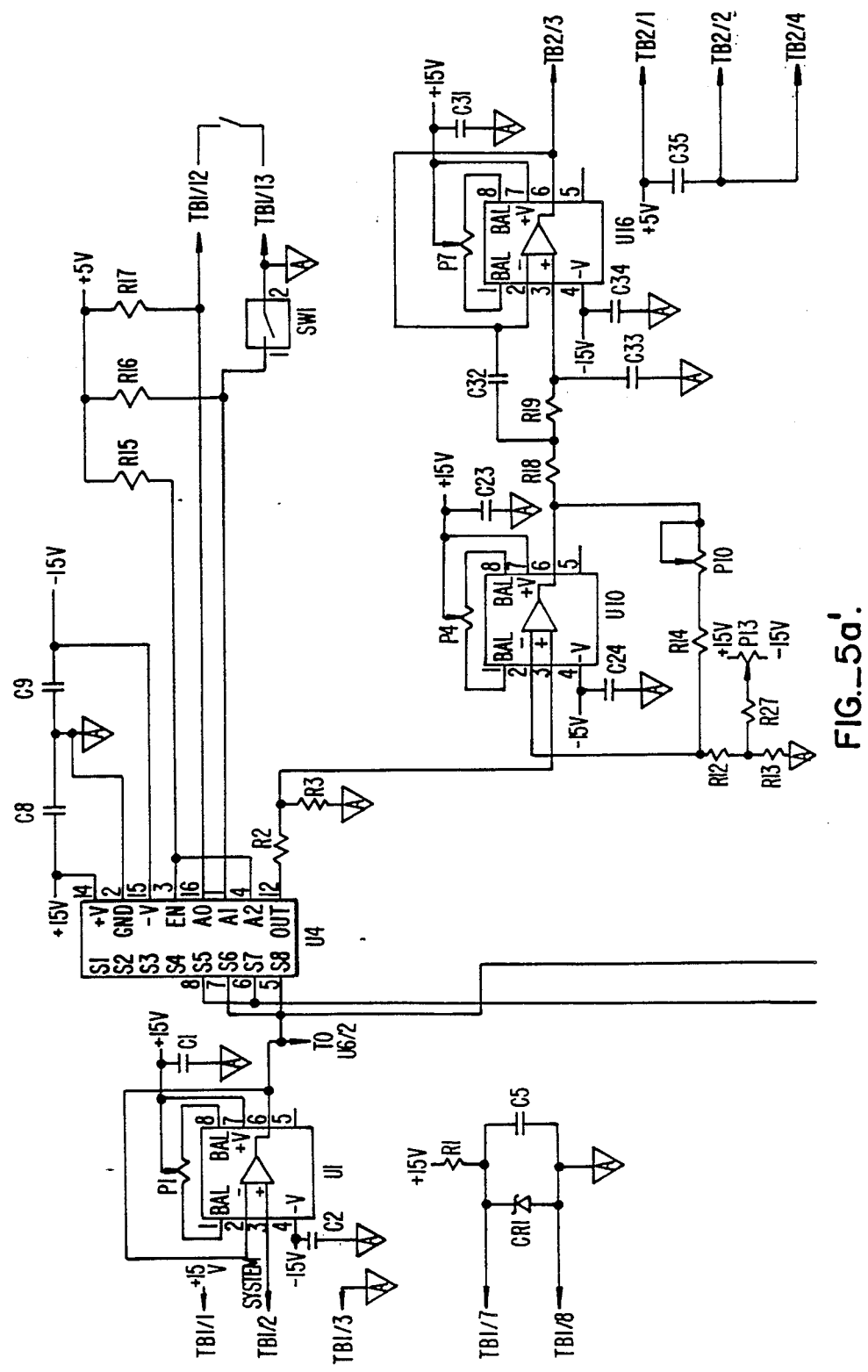
FIG._5a.

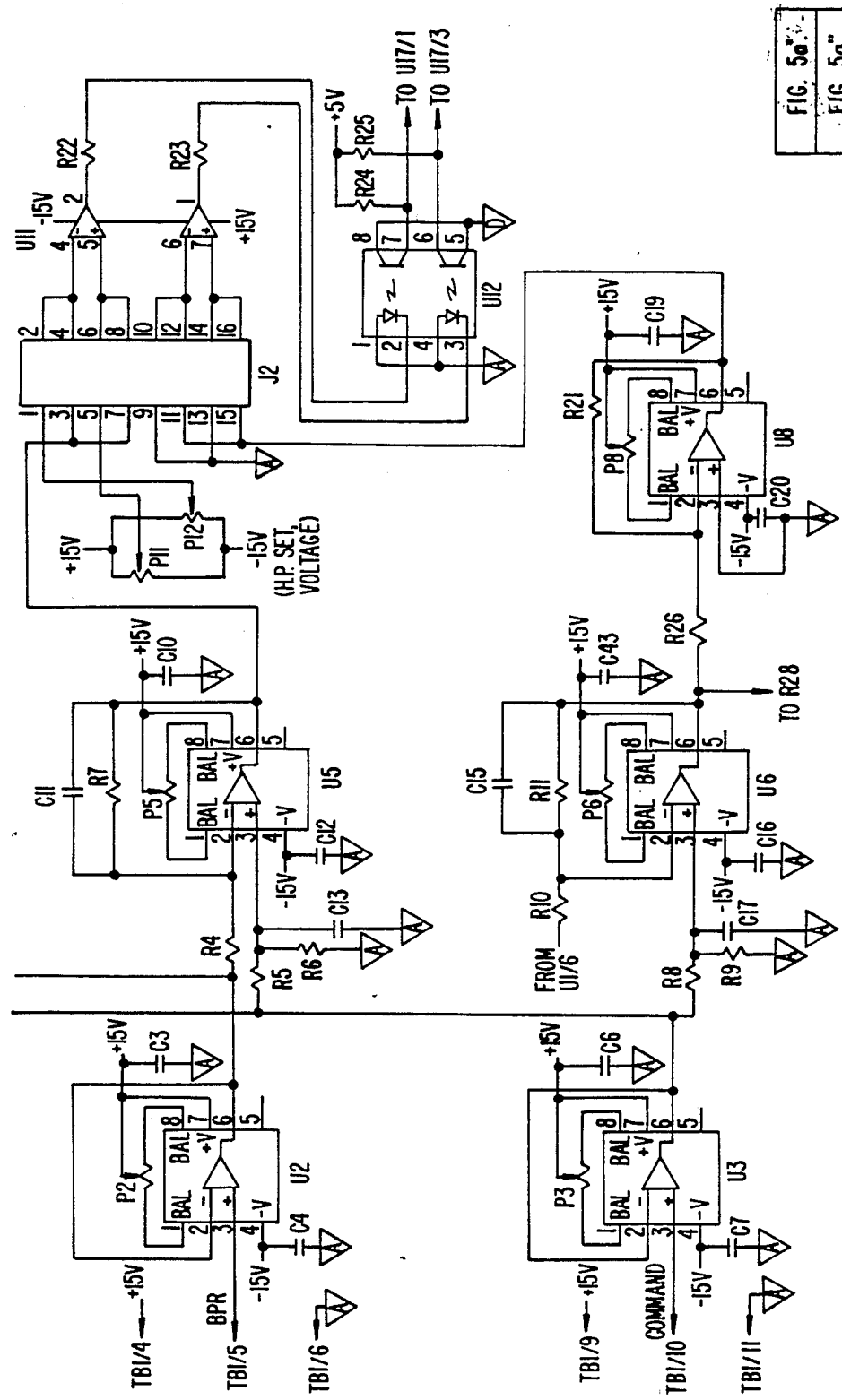
FIG._5a.

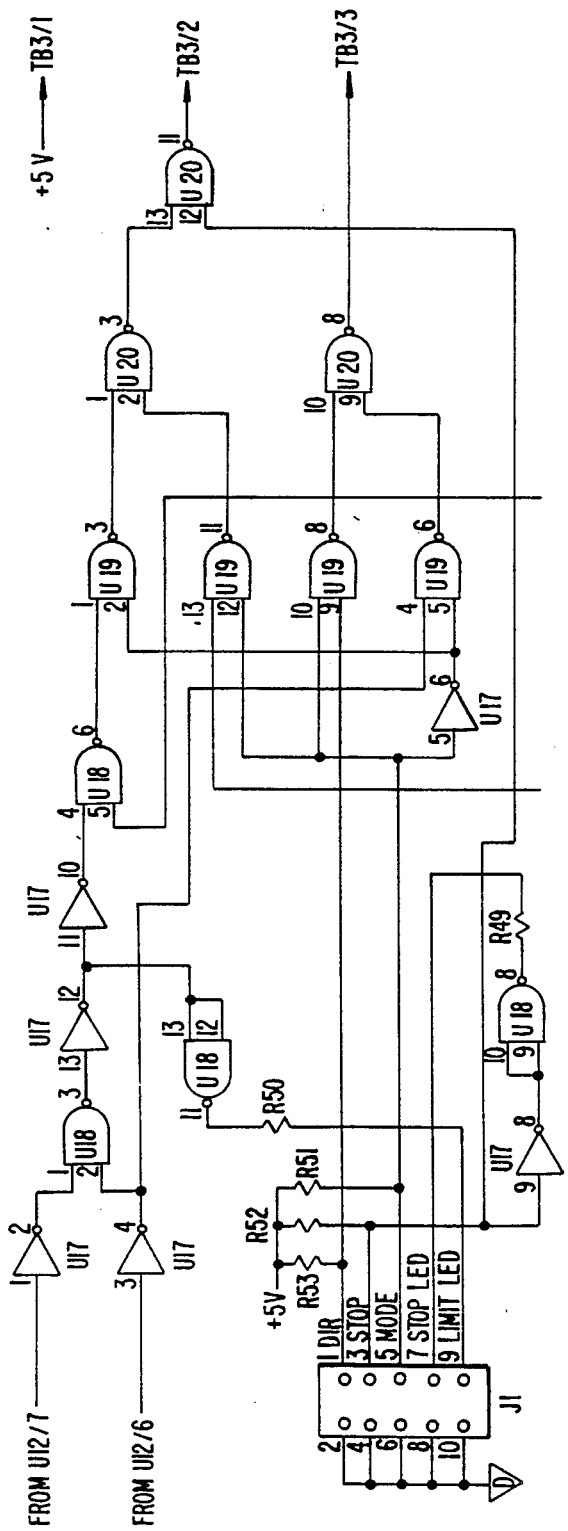
FIG.—5b'.

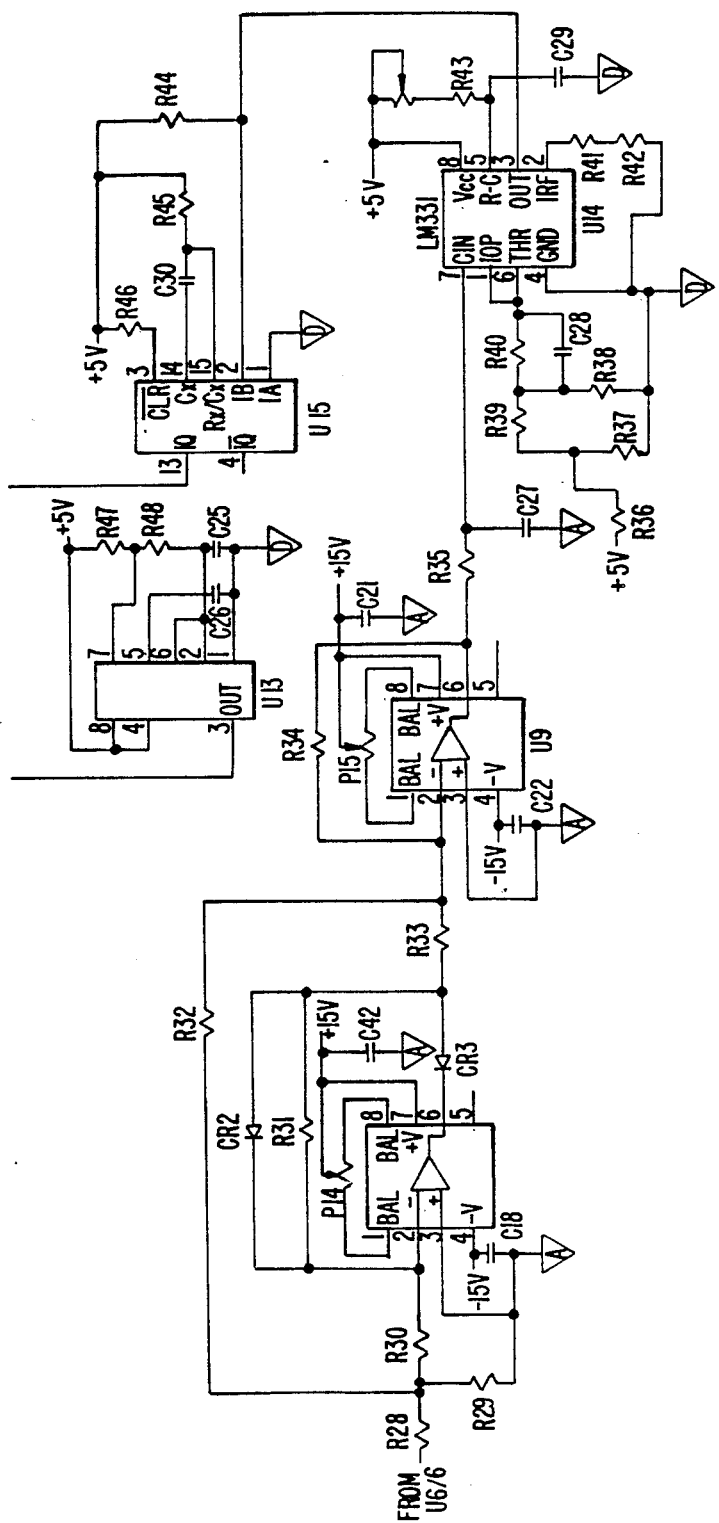

PRESSURE REGULATOR

BACKGROUND OF THE INVENTION

1. Field of the Invention

The present invention relates to the field of process control valves. More particularly, the present invention provides an improved pressure regulating valve and control system especially for use in laboratory process systems.

2. Description of Related Art

In a wide variety of process control systems it is often desirable to carefully regulate the pressure in a portion of the process. For example, in a laboratory apparatus it is often necessary to accurately regulate liquid or gas pressure in a vessel. This is usually accomplished by installing a backpressure control valve on the outlet of the vessel. The pressure upstream of the valve is monitored and the valve is opened if the upstream pressure becomes too high. Conversely, if the pressure becomes too low, the valve is closed. Upstream pressure control valves operate in reverse and are installed upstream of the vessel. Downstream pressure is monitored and the valve is closed when the pressure becomes too high. The valve is opened as downstream pressure becomes too low.

Two types of valves are commonly used as backpressure control valves. In spring-loaded valves, the pressure of the fluid or gas being controlled is exerted against a spring in the valve. As the pressure of the fluid being controlled increases, the spring is compressed, resulting in the valve being closed. As the pressure of the fluid being controlled decreases, the spring overcomes pressure exerted by the fluid and the valve opens. The pressure at which the valve regulates pressure is generally adjusted by way of a threaded cap on the spring. Tightening the cap compresses the spring and, therefore, increases backpressure.

Dome-loaded regulators utilize a diaphragm plate on which pressure from a dome is exerted. As the system pressure increases, the diaphragm pressure is overcome, and liquid or gas bleeds out through a vent hole, permitting the valve to open. Dome pressure is controlled by using another pressure regulator in line with the dome regulator.

Both of the above-described pressure control valves have a number of limitations. For example, such valves often utilize a compressible element between the control mechanism and the element which restricts flow. Therefore, slow response and long term drift are often observed in such valves. Valve behavior also varies with the type of fluid in the system, which can lead to serious perturbations in the operation of a system. Further, both types of valves often require operator attention to maintain accuracy over long time intervals. Still further, the above-described valves result in difficulties in automating process control because they require elaborate motor-driven mechanisms (for the spring-loaded valves) or sophisticated servo-controlled gas or liquid control valves (for the dome-loaded valves). Consequently, present process control valves permit only crude control over the pressure in a process, even with computer controlled systems.

It is seen that an improved pressure control method and apparatus is desired.

SUMMARY OF THE INVENTION

The present invention provides an improved method and apparatus for pressure control. The pressure control system disclosed herein includes a pressure control valve and an electronic control system. The pressure control valve utilizes a pressure regulated diaghragm to restrict flow. Pressure against diaphragm is controlled by a stepper motor which regulates the pressure of a liquid column against the diaphragm. By using a liquid and a stepper motor to modulate the diaphragm, response of the valve is direct, accurate, and quick.

The electronic control system includes a pressure transducer in the liquid flow stream for detecting pressure therein. A voltage signal is sent to a control board from the transducer and compared to a fixed reference voltage. If the voltage from the transducer deviates from the reference voltage, the stepper motor is activated to increase or decrease the pressure in the liquid column.

The control system also avoids the need for either a clock or an A/D or D/A converter circuit. This is accomplished by using an analog difference amplifier and a voltage-to-frequency converter to provide desired pulses to a stepper motor driver.

Accordingly, in one embodiment the invention comprises means for detecting pressure in a flow stream; a diaphragm in contact with a flow stream; and means, responsive to the means for detecting, for increasing a pressure in a liquid filled region, the liquid filled region in contact with and urging the diaphragm into the flow stream to restrict flow therein.

In a preferred embodiment the apparatus includes an inlet flow line, the inlet flow line having a pressure transducer therein; a vent flow line; a diaphragm between the inlet flow line and the discharge flow line for restricting flow from the inlet flow line to the vent line; a liquid filled region adjacent the diaphragm opposite the flow lines; a piston in the liquid filled region; a step motor driven ball screw and ball nut for urging the piston into the liquid filled region; a spring for urging the piston out of the liquid filled region; and a control means. The control means may further include means for generating a reference voltage; means for comparing the reference voltage to a voltage from the pressure transducer; and means for activating the motor in response to the means for comparing.

A method of controlling pressure in a flow line is also disclosed. The method may include the steps of monitoring pressure in a flow stream; and, based on said pressure in a flow stream, increasing pressure in a liquid filled region, said liquid filled region urging a diaphragm into said flow stream whereby flow is restricted therein.

BRIEF DESCRIPTION OF THE FIGURES

Figure 1 illustrates a process control system used to operate a backpressure control valve.

FIG. 2 illustrates the pressure control valve in greater detail.

FIG. 3 illustrates the valve diaphragm area in greater area.

FIG. 4 provides a block diagram of the control electronics.

FIGS. 5a and 5b provide details of the electronic control system.

DETAILED DESCRIPTION OF THE PREFERRED EMBODIMENTS

FIG. 1 illustrates a pressure control system 2. The system includes a control valve 4, which is used to regulate the pressure in an inlet flow line 6. Valve 4 is attached to and controlled by a control assembly 8, which receives input from a flow line pressure transducer 10 and a valve pressure transducer 12. Based on the input from the flow line pressure transducer and the valve pressure transducer, control assembly 8 provides control to a step motor 14. Step motor 14 is connected to and operates valve 4 to provide a desired pressure level in flow line 6.

Valve 4 includes a pressure controlled diaphragm valve body 16. The body includes inlet flow path 18, outlet flow path 20, and a diaphragm 22 between the inlet flow path and the outlet flow path. Diaphragm 22 is constructed of teflon in a preferred embodiment.

In order to restrict flow from the inlet flow path to the outlet flow path, diaphragm 22 is forced downward by pressure in liquid column 24. Column 24 is filled with an essentially incompressible liquid which, in a preferred embodiment is an oil such as hydraulic fluid. It will be recognized by those of skill in the art that a wide variety of liquids could be used in the column 24 such as silicone, mineral oil, alcohol, water, or the like without departing from the scope of the invention.

As the diaphragm is forced downward, a flow path 26 from the inlet to the outlet is restricted, resulting in reduced flow. Conversely, to permit greater flow from the inlet to the outlet, the pressure in column 24 is reduced, allowing the diaphragm to rise such that the size of flow path 26 is increased, resulting in increased flow.

The control assembly 8 includes a front panel control potentiometer 28 which is used to supply a fixed reference voltage. The fixed reference voltage is supplied to main control board 30, along with voltages representative of pressure from transducers 10 and 12. Output from the control board is provided to digital readout 32 and motor driver 34.

In operation, the pressure of liquid or gas in flow line 6/inlet 18 is monitored with pressure transducer 10. Transducer 10 sends an appropriate voltage signal representative of the pressure in the inlet flow line to control board 30. The control board 30 compares the voltage from transducer 10 to the fixed reference voltage supplied from control potentiometer 28. If the voltage supplied by the transducer 10 deviates from the reference voltage, the control board supplies a series of pulses to the motor driver, which are further used to generate motion in the motor 14. The motor then drives a piston-type pump in a direction which decreases or increases the pressure inside the liquid column 24 and, therefore, adjusts the position of diaphragm 22. By moving the diaphragm downward, the flow path 26 is closed. By releasing pressure in the column 24, pressure in the flow path 26 forces the diaphragm upward, further opening the valve.

One embodiment of the control valve 4 is illustrated in greater detail in FIG. 2 in which the components shown in FIG. 1 have been supplied with like reference numerals. Step motor 14 is connected to the valve 4 with a motor base plate 36. The motor base plate is, in turn, connected to a bearing support plate 38 which holds guide and main bearings 40a and 40b, respectively. Bearing support plate is connected to a main valve body 42.

Motor 14 includes a drive shaft 44 which is connected to a ball screw and ball nut 46a and 46b, respectively, through straight coupling 48. Ball nut 46a is attached to a guide bushing 50 which slides in a plastic linear bearing 52. A guide pin 54 is connected to bushing 50 to prevent the bushing from rotating during rotation of the motor and to provide a visual indication of the valve position. The guide pin moves vertically in the body in an elongated slot 56.

As the motor rotates, the bushing 50 moves downward, pushing upon a piston 58. Piston 58 is guided by a support plate 60 which is mounted to the valve body 42. A spring 61 is provided between piston 58 and support plate 60 such that piston 58 remains in contact with bushing 50, even as the bushing moves away from the piston. Support plate 60 also provides support for a seal 62, particularly at high pressures. A seal spacer 63 and seal 62 provide isolation of liquid in region 24.

The main valve body 42 is connected at its lower end to the support plate and a diaphragm body 64 which is illustrated in greater detail in FIG. 3. Between the bottom of piston 58 and the top of diaphragm 18, the fluid filled region 24 is provided. A valve cap 66 seals the diaphragm to the diaphragm body and the cap. Inlet port 18 and outlet port 20 are machined into the cap and include appropriately connected flow lines and seals. Transducer 12 is used to provide pressure measurements from the region 24 to the control board 30. The voltage from transducer 12 is compared to a control voltage and is used to put upper and lower limits on the pressure in the liquid region 24. This reduces the possibility of valve failure and limits overshoot. Fluid distribution spacers 68 may be used to distribute fluid evenly around the diaphragm. Transducer 10 is installed in the valve cap in-line with the fluid inlet line 18.

In operation, the control board provides an appropriate signal such that the motor 14 is activated. The motor may, for example, rotate clockwise, in which case the bushing 50 and, therefore, the piston 58 moves downward. Pressure in region 24 is increased, urging the diaphragm downward. The flow path from inlet flow line 18 to outlet flow line 20 is thereby restricted, increasing the pressure in flow line 18. Conversely, the motor may be rotated in a reverse direction, in which case the bushing is moved upwards. The spring 61 then urges the piston away from the region 24, decreasing the pressure therein. The diaphragm, therefore, moves away from the flow path between the inlet flow line and the outlet flow line, permitting greater flow therethrough. The pressure in line 18 is, therefore, decreased.

FIG. 4 illustrates one embodiment of the control system 8 in greater detail. All of the components shown therein are readily available, commerical components. As shown, both the system pressure voltage and a voltage representative of desired pressure in the system are input to signal conditioning devices 70a and 70b, respectively, to smooth variations in voltage over time providing outputs $V_s$ and $V_d$, respectively. $V_s$ is generally proportional to the pressure in flow line while $V_d$ is generally proportional to a desired pressure set by the user. $V_s$ and $V_d$ serve as inputs to analog difference multiplier 72 which provides an analog output voltage representative of the difference between $V_s$ and $V_d$. The output from analog difference multiplier 72 is provided to analog gain device 74 for increasing the voltage by a constant, $K_1$. The output from analog gain device 74 is input to voltage-to-frequency converter 76, the output of which is provided to digital control logic 78.

The difference of $V_s$ and $V_d$ is also provided to a second analog gain device 80 with a gain constant $K_2$. The output therefrom is provided to a comparator 82 which compares the output from analog gain device 80 to a reference signal which provides an upper limit on valve movement. The output from comparator 82 is also provided to digital logic device 78. Digital control logic 78 then drives stepper motor driver 34 based on the frequency of voltage-to-frequency converter, which limits based on the output of comparator 82.

Pressure transducer 12 provides a voltage signal representative of fluid pressure in the black pressure regulator. This voltage signal is provided to signal conditioning device 70c. The output of signal conditions 70c is provided to analog difference amplifier 84 which provides an output representative of the difference between $V_d$ and the voltage from pressure transducer 12.

The output from analog difference amplifier 84 is provided to comparator 86 for comparison to a referenced signal, the output of which is also provided to digital control logic 78. This input is used to safeguard the valve against, for example, excessively high pressure conditions and provides upper limits on valve movement so as to prevent overshoot by the valve.

A digital start/stop command, manual/automatic command, and manual direction command are also supplied to digital control logic 78. Start/stop command is used to stop operation of the valve in its present position. The manual/automatic command is used to switch the valve from manual to automatic. The direction command enables the user to open/close the valve manually.

Greater detail regarding one embodiment of the control system is provided in FIGS. 5a and 5b, and the system is briefly described below.

Referring first to FIG. 5a, the signal "command" (TB110) is a DC voltage repesentative of the desired pressure in the system. This voltage is supplied to differential amplifier U3. A DC voltage representative of the system pressure is also supplied to pin 2 of amplifier U6 via an input signal SYSTEM from the system transducer. The SYSTEM signal is conditioned in amplifier U1 prior to comparison.

To drive a stepper motor it is usually necessary to provide both a sign bit and frequency signal to the motor. The sign bit controls the direction of movement of the motor and the frequency controls the rate of movement. To produce the frequency signal, the output of U6 is first provided to resistor R28 in FIG. 5b and rectifiers U7/U9 so that either positive or negative outputs from U6 are converted to a positive DC signal. The output from pin 6 of U9 is provided to voltage-to-frequency converter U14. Assuming the safety logic in the top half of FIG. 5b does not limit the signal, it is provided to the stepper motor via signal TB/32.

To provide the sign bit to the stepper motor, the output of U6 is also provided to amplifier U8 and, ultimately, provides either a +15 v or −15 v signal to the safety logic in the top portion of FIG. 5b. Assuming this signal is not limited by the safety logic, it serves as the sign bit signal to the stepper motor via signal TB3/3.

The signal BPR in FIG. 5a is a DC voltage which is representative of the pressure in liquid region 24. When the signal BPR exceeds a user-set value, stepper motor movement is restricted. When the BPR signal goes lower than the pre-set percentage of system pressure, the valve is again permitted to move. This serves to prevent overshoot of the valve and prevents the valve from self-destructing due to excessively high pressure in the liquid region 24.

Potentiometers P11 and P12 are used to set voltages which will be representative of maximum and minimum percentages of the system pressure above/below which the pressure of the liquid region pressure may not exceed. P11, for example, sets a maximum percentage of overshoot. U11 toggles to a digital output which U12 coverts to 5 v (for TTL logic).

Various manual controls are also provided by the system. For example, the "mode" signal is set by the user and is NAND'd with the frequency signal and sign bits used to drive the stepper motor. If the mode switch is in a manual position, these signals become ineffective. When the system is in manual operation, a frequency signal from oscillator U13 drives the stepper motor and the direction of manual motion is set by the DIR signal. The STOP signal is controlled by the user and immediately stops motion of the valve.

It is to be understood that the above description is intended to be illustrative and not restrictive. Many embodiments will be apparent to those of skill in the art upon reviewing the above description. For example, the above description has been primarily with reference to a backpressure control valve, but the principles could readily be applied by one of skill in the art to a downstream pressure control valve. In a preferred embodiment the valve is utilized in a laboratory pressure control assembly as in, for example, a fluid flow type device such as a core tester, but a wide range of applications will be readily apparent. The scope of the invention should, therefore, be determined not with reference to the above description, but should instead be determined with reference to the appended claims, along with the full scope of equivalents to which such claims are entitled.

What is claimed is:

1. A valve for controlling pressure in a flow line comprising:
    (a) means for detecting pressure in said flow line;
    (b) a diaphragm in contact with said flow line; and
    (c) means, responsive to said means for detecting, for increasing a pressure in a liquid filled region, said liquid filled region in contact with and urging said diaphragm into said flow line to restrict flow therein, said means for increasing pressure further comprises:
        (i) an electric motor driven pump means in contact with said liquid filled region; and
        (ii) a controller for receiving a signal from said means for detecting pressure and activating said motor in response thereto.

2. Apparatus as recited in claim 1, wherein said liquid filled region is an oil filled region.

3. A valve as recited in claim 1, wherein said means for detecting pressure in said flow line is a pressure transducer.

4. Apparatus as recited in claim 1, wherein said electric motor driven pump means further comprises:
    (a) a step motor; and
    (b) a piston connected to said step motor, said piston driveable by said motor from a first position in said liquid filled region to a second position in said liquid filled region.

5. Apparatus as recited in claim 1, wherein said controller further comprises:
    (a) means for supplying a reference voltage;

(b) means for comparing a voltage from said means for detecting pressure to said reference voltage; and (c) a driver adapted to activate said motor in response to an output from said means for comparing.

6. Apparatus as recited in claim 5, wherein said output from said means for comparing is converted to a pulse signal, said pulse signal having a frequency related to said output from said means for comparing, wherein said pulse signal is used to provide an input to said driver.

7. A valve for controlling pressure in a flow line comprising:
   (a) means for detecting pressure in said flow line;
   (b) a diaphragm in contact with said flow line;
   (c) means, responsive to said means for detecting, for increasing a pressure in a liquid filled region, said liquid filled region in contact with and urging said diaphragm into said flow line to restrict flow therein, said means for increasing pressure further comprising:
      (i) an electric motor driven pump means in contact with said liquid filled region; and
      (ii) a controller for receiving a signal from said means for detecting pressure and activating said motor in responsive thereto, said controller further comprising:
         means for supplying a reference voltage;
         means for comparing a voltage from said means for detecting pressure to said reference voltage; and
         a driver adapted to activate said motor in response to an output from said means for comparing;
   (d) means for detecting a pressure in said liquid filled region;
   (e) means for comparing a second reference voltage to a voltage representative of said pressure in said liquid filled region to provide a restriction output; and
   (f) means for restricting movement of said piston based on said restriction output.

8. Apparatus as recited in claim 4, wherein said step motor further comprises:
   (a) a ball screw and ball nut on a shaft of said motor;
   (b) a guide bushing attached to said ball nut; and
   (c) a spring for urging said piston against said bushing.

9. Apparatus as recited in claim 1, wherein said controller further comprises means for providing a binary signal to disable said control means.

10. Apparatus as recited in claim 1, wherein said controller further comprises means for a user to activate said pump in a desired direction.

11. Apparatus for regulating pressure in a flow line comprising:
   (a) an inlet flow line, said line, said inlet flow line having a pressure transducer therein;
   (b) a vent flow line;
   (c) a diaphragm between said inlet flow line and said discharge flow line for restricting flow from said inlet flow line to said vent line;
   (d) a liquid filled region adjacent said diaphragm opposite said flow lines;
   (e) a piston in said liquid filled region;
   (f) a step motor driven ball screw and ball nut for urging said piston into said liquid filled region;
   (g) a spring for urging said piston out of said liquid filled region;
   (h) a control means, said control means further comprising:
      (i) means for generating a reference voltage;
      (ii) means for comparing said reference voltage to a voltage from said pressure transducer; and
      (iii) means for activating said motor in responsive to said means for comparing; and
   (i) a pressure transducer in said liquid filled region, said transducer monitoring pressure in said liquid filled region for overpressure or underpressure.

* * * * *